(12) United States Patent
Madhavarapu et al.

(10) Patent No.: US 8,401,998 B2
(45) Date of Patent: Mar. 19, 2013

(54) MIRRORING FILE DATA

(75) Inventors: Pradeep Jnana Madhavarapu, Kirkland, WA (US); Priyank Porwal, Redmond, WA (US); Vaibhav Kamra, Bellevue, WA (US); Alexandru C. Chirica, Toledo, OH (US); Cristian Diaconu, Kirkland, WA (US); Jun Fang, Sammamish, WA (US); Srinivasmurthy P. Acharya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 12/875,004

(22) Filed: Sep. 2, 2010

(65) Prior Publication Data
US 2012/0059798 A1    Mar. 8, 2012

(51) Int. Cl.
*G06F 17/30* (2006.01)
(52) U.S. Cl. ........................... 707/655; 707/660
(58) Field of Classification Search ............ 707/655, 707/660
See application file for complete search history.

(56) References Cited

U.S. PATENT DOCUMENTS

| | | | |
|---|---|---|---|
| 6,980,988 B1 | 12/2005 | Demers | |
| 7,523,110 B2 | 4/2009 | Holenstein | |
| 7,565,661 B2 | 7/2009 | Sim-Tang | |
| 7,613,741 B2 | 11/2009 | Lu | |
| 2001/0039548 A1* | 11/2001 | Shinkai et al. | 707/201 |
| 2003/0220935 A1 | 11/2003 | Vivian | |
| 2006/0047713 A1 | 3/2006 | Gornshtein | |
| 2006/0136685 A1 | 6/2006 | Griv | |
| 2006/0253502 A1* | 11/2006 | Raman et al. | 707/202 |
| 2007/0185938 A1* | 8/2007 | Prahlad et al. | 707/204 |

OTHER PUBLICATIONS

Surapaneni, Sreeram, "Very Large Databases and High Availability Evaluating Replication Options", Based on information and belief available, at least as early as Sep. 1, 2010, 10 pages.

Oracle, "Oracle Database High Availability Solutions", Based on information and belief available, at least as early as Sep. 1, 2010, 21 pages.

* cited by examiner

*Primary Examiner* — John E Breene
*Assistant Examiner* — Alex Gofman
(74) *Attorney, Agent, or Firm* — Workman Nydegger

(57) ABSTRACT

The present invention extends to methods, systems, and computer program products for mirroring file data. Generally, high availability and disaster recovery ("HADRON") is achieved within a database management system by detecting which parts of a file have changed and sending the changed parts to secondaries. Adjacent or partially overlapping parts of a file can coalesce to form larger chunks of changed data. Coalescing reduces the overall number of chunks that are tracked.

20 Claims, 5 Drawing Sheets

MIRRORING FILE DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In a variety of database architectures, binary large object ("blob") data is stored separately from a main database file. As such, changes to blob data are typically not included in a database log. Since blob data is not included in the database log, it is more difficult to mirror or send changes to blob data to secondary database servers, such as, for example, for high availability or disaster recovery.

Some prior mechanisms have resorted to copying entire files to a secondary server even when only a small part of a file has changed. For example, an entire large video file may be copied when header/tag information changes. Copying entire files can be highly inefficient since it transfers significant amounts of data across a network even when little activity occurs on the primary server.

BRIEF SUMMARY

The present invention extends to methods, systems, and computer program products for mirroring file data. Embodiments of the invention include mirroring changes to file system data from a primary database server to secondary database servers. The primary database server includes a database, a separate file system, and a transaction log. A file command directed to a file stored in the file system is intercepted. The file command includes a filename, an offset, and a size. The file name indentifies the name of the file. The size and offset represent a portion of the file that is to change. The offset indicates a position within the file and the size represents how much data starting from the position and moving towards the end of the file is to change.

The size and offset from the intercepted file command are written into the transaction log to identify the portion of the file that is to change. In some embodiments, sizes and offsets are written to the transaction log as they occur. In other embodiments, sizes and offsets are written to the transaction log in response to some signal, such as, for example, accumulating a specified number of sizes and offsets, expiration of timer, when a file is closed, etc.

In some embodiments, adjacent and/or overlapping portions of a file are combined in data blocks. In these embodiments, offsets and sizes for the data blocks can be computed from a number of offsets and sizes associated with intercepted file commands. Similar signals can be used to indicate when offsets and size for blocks are to be written to the transaction log.

Subsequently, and for example in accordance with a database replication system, offsets and sizes for a file command or block are read from the transaction log. For each offset and size, the portion of data identified by the offset and size is accessed from within the file. The accessed portion of the file is sent to the one or more secondary database servers. The portion of the transaction log containing the size and offset from the file command is sent to the one or more secondary database servers subsequent to sending the portion of the file to the one or more secondary database servers.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
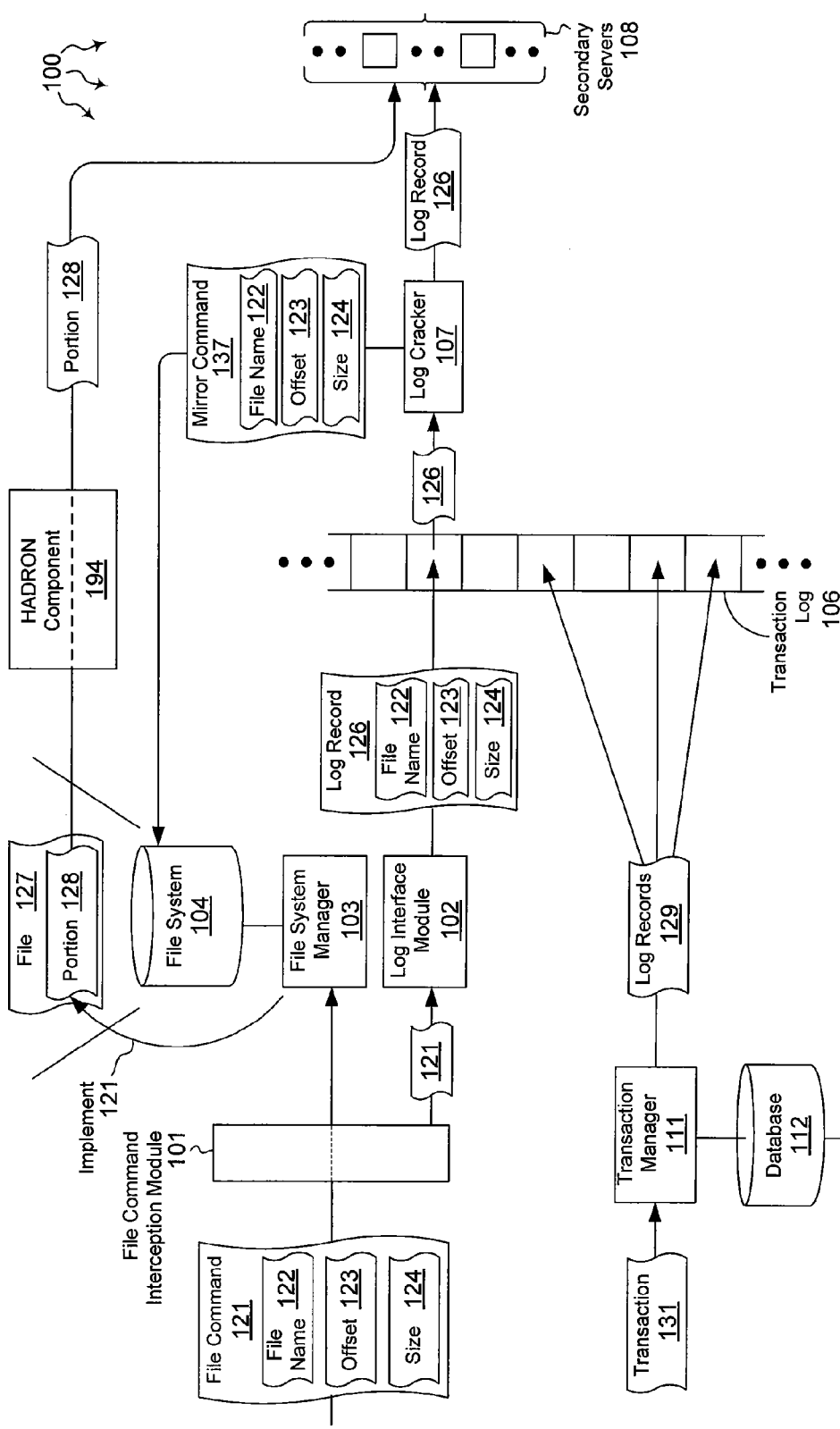
FIG. 1 illustrates an example computer architecture that facilitates mirroring file data.

The present invention extends to methods, systems, and computer program products for mirroring file data. Embodiments of the invention include mirroring changes to file system data from a primary database server to secondary database servers. The primary database server includes a database, a separate file system, and a transaction log. A file command directed to a file stored in the file system is intercepted. The file command includes a filename, an offset, and a size. The file name indentifies the name of the file. The size and offset represent a portion of the file that is to change. The offset indicates a position within the file and the size represents how much data starting from the position and moving towards the end of the file is to change.

The size and offset from the intercepted file command are written into the transaction log to identify the portion of the file that is to change. In some embodiments, sizes and offsets are written to the transaction log as they occur. In other embodiments, sizes and offsets are written to the transaction log in response to some signal, such as, for example, accumulating a specified number of sizes and offsets, expiration of timer, when a file is closed, etc.

In some embodiments, adjacent and/or overlapping portions of a file are combined in data blocks. In these embodiments, offsets and sizes for the data blocks can be computed from a number of offsets and sizes associated with intercepted file commands. Similar signals can be used to indicate when offsets and size for blocks are to be written to the transaction log.

Subsequently, and for example in accordance with a database replication system, offsets and sizes for a file command or block are read from the transaction log. For each offset and size, the portion of data identified by the offset and size is accessed from within the file. The accessed portion of the file is sent to the one or more secondary database servers. The portion of the transaction log containing the size and offset from the file command is sent to the one or more secondary database servers subsequent to sending the portion of the file to the one or more secondary database servers.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, high availability and disaster recovery ("HADRON") is achieved within a database management system by detecting which parts of a file have changed and sending the changed parts to secondaries. Adjacent or partially overlapping parts of a file can coalesce to form larger chunks of changed data. Coalescing reduces the overall number of chunks that are tracked.

FIG. 1 illustrates an example computer architecture 100 that facilitates mirroring data. Referring to FIG. 1, computer architecture 100 includes file command interception module 101, log interface module 102, file system manager 103, file system 104, transaction log 106, log cracker 107, HADRON component, 194, secondary servers 108, transaction manager 111, database 112, and query manager 113. Each of the depicted components can be connected to one another over (or is part of) a system bus and/or a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, query manager 113 manages processes queries, such as, for example, query 132, issued against data contained in database 112. In response to a query, query manager 113 can return query results (data from database 112) to a party that issued the query. Transaction manager 111 is configuring to manager and processes transactions, such as, for example, transaction 131, issued against data contained in database 112. In response to a transaction, transaction manager 111 can add, delete, modify, etc., data in database 112. Transaction manger 111 can maintain a history of executed actions in transaction log 106 to insure consistency in case of a failure. For example, for transaction 131, transaction manager 111 can record log records 129 in transaction log 106.

File command interception module is configured to intercept file commands directed to files in file system 104. When a file command is intercepted, the file command is forwarded to log interface module 102. Log interface module 102 can create a log record containing data from the file command. Log interface module 102 can record the log entry in transaction log 106 along with other records from transaction manger 111 (and other database system components that write to transaction log 106).

The file command is also permitted to proceed through to file system manager 103 (or some other module would otherwise process file commands for file system 104 in absence of file command interception module 101). File system manager 103 can implement the intent of a file command (read, write, delete, modify, etc.) on a file contained in file system 104.

For example, it may that file command interception module 101 intercepts file command 121. File command 121 can one of any number of different types of commands such as, for example, a file system API command or a T-SQL command. File command 121 can be a command such as, for example, a write completion command or a file close command that indicates a specified change to a file is complete. File command interception module 101 forwards file command 121 to log interface module 102. File command interception module 101 also permits file command 121 to pass through to file system manager 103.

File command 121 includes file name 122, offset 123, and size 124. File name 122 can be the name of file 127. File 127 can be virtually any type of file, such as, for example, a document, an electronic message, an audio and/or video file, a spreadsheet, etc. Collectively, offset 123 and size 124 can represent portion 128. Offset 123 can indicate a (e.g., byte) position within file 127 for the beginning of portion 128. Size 124 can represent how much data (e.g., a number of bytes), starting from the position (identified by offset 123) and moving towards the end of the file, is to be changed by file command 121. File system manager 103 can implement file command 121 to change portion 128 in some manner (add, modify, delete, etc).

Log interface module 102 creates log record 126 that contains file name 122, offset 123, and size 124. Log interface module 102 records log record 126 into transaction log 106.

From time to time, portions of transaction log 106 are replicated to secondary servers 108. When the log record is of the format of log record 126, the log record is delivered to log cracker 107. Log cracker 107 reads the log record and formulates a corresponding mirror command. The mirror command issued to file system 104. The mirror command instructs HADRON component 194 to transfer an identified portion of a file to secondary servers 108. HADRON component 194 is generally configured to protect against data loss by replicating data changes to secondaries 108. After the portion of the file is transferred to secondary servers 108, the log record is then also transferred to secondary servers 108.

For example, log cracker 107 can read log record 126 from transaction log 106. Log cracker 107 can formulate mirror command 137, including file name 122, offset 123, and size 124, from log record 126. Log cracker 107 issues mirror command 127 to file system 104. File system 104 receives mirror command 137 from log cracker 107. Using file name 122, offset 123, and size 124, file system 104 determines that mirror command 137 is identifying portion 128. In response to mirror command 137, HADRON component 194, sends portion 128 to secondary servers 108. Subsequently, log cracker 107 sends log record 126 to secondary servers 108. Accordingly, when portions of a file (e.g., a Binary Large Object ("BLOB")) change, the change portions can be identified and transferred to secondary servers (without having to transfer the entire file).

Figure 2:
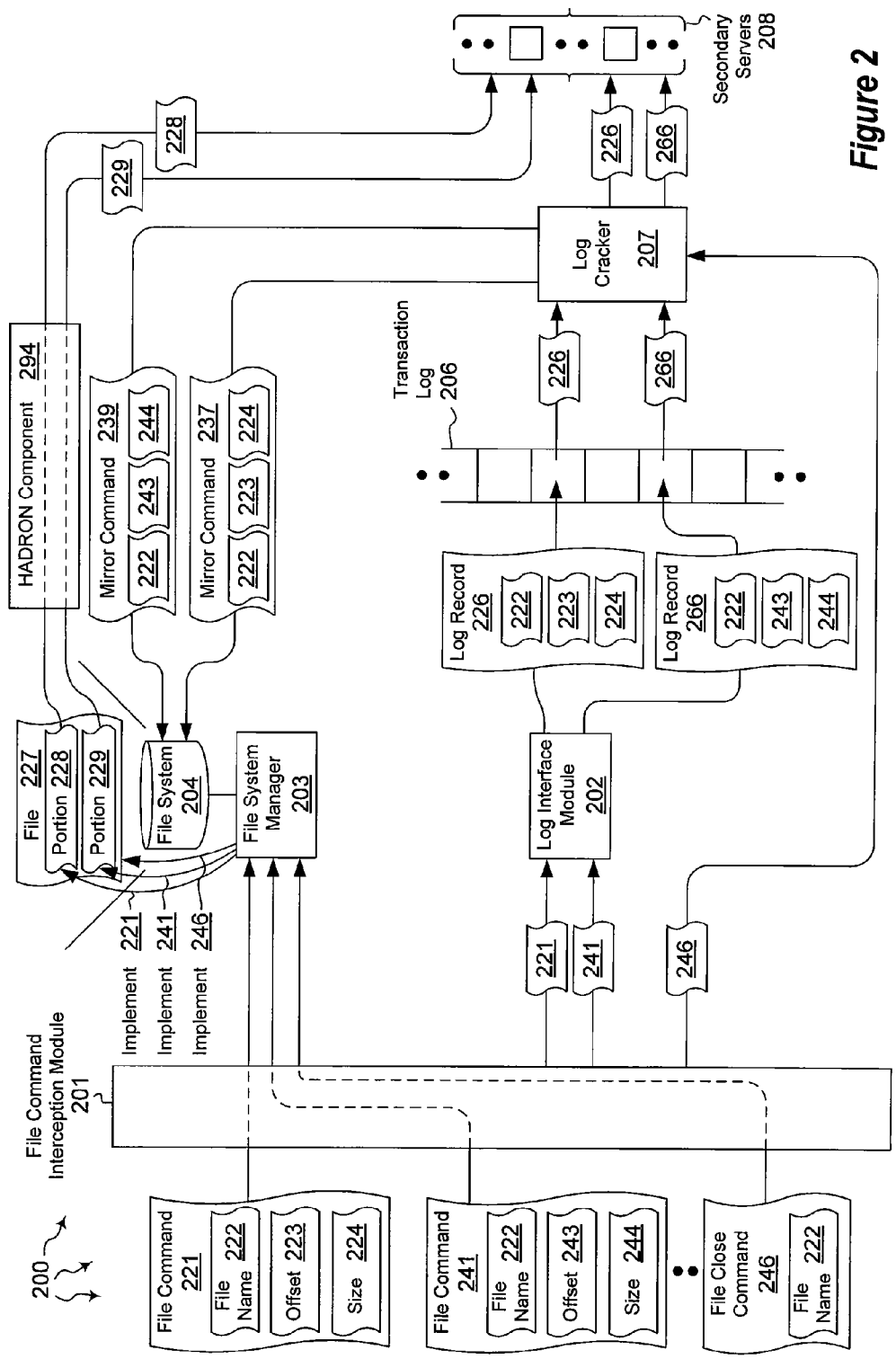
FIG. 2 illustrates another example computer architecture that facilitates mirroring file data.

FIG. 2 illustrates computer architecture 200, similar to computer architecture 100, that facilitates mirroring data. As depicted, computer architecture 200 includes file command interception module 201, log interface module 202, file system manager 203, file system 204, transaction log 206, log cracker 207, HADRON component 294, and secondary servers 208. The components of computer architecture 200 have similar functionality to like named components in computer architecture 100 and can be similar connected to another and components at other computer systems.

Figure 3:
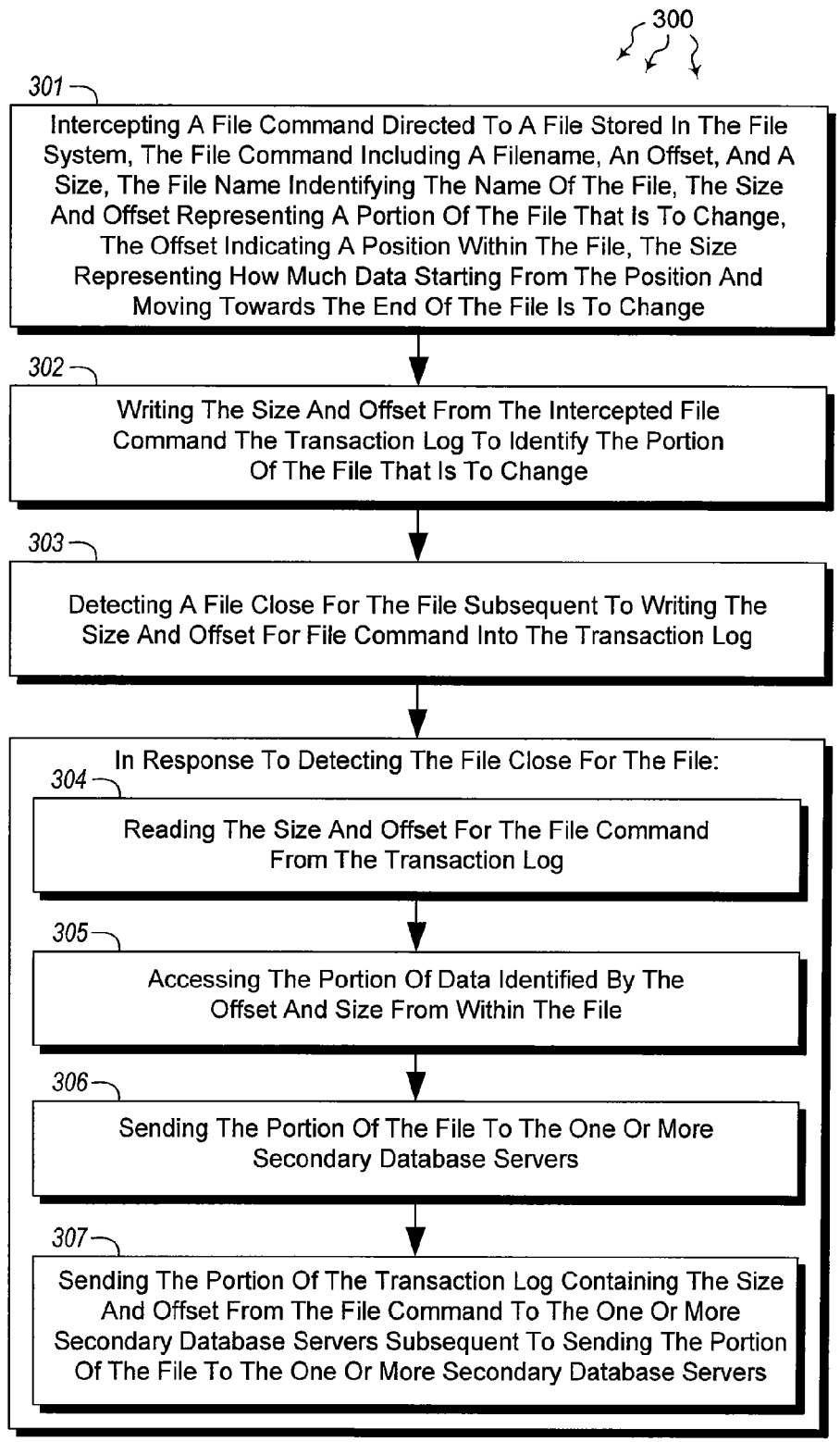
FIG. 3 illustrates a flow chart of an example method for mirroring file data.

FIG. 3 illustrates a flow chart of an example method 300 for mirroring file data. Method 300 will be described with respect to the components and data of computer architecture 200.

Method 300 includes an act of intercepting a file command directed to a file stored in the file system, the file command including a filename, an offset, and a size, the file name indentifying the name of the file, the size and offset representing a portion of the file that is to change, the offset indicating a position within the file, the size representing how much data starting from the position and moving towards the end of the file is to change (act 301). For example, file command intercept module 201 can intercept file command 221, including file name 222, offset 223, and size 224. File name 222 indentifies the name of file 227. Offset 223 and size 224 represent portion 228. Offset 223 indicates a starting position in file 227 where portion 228 starts. Size 224 represent how much data from the starting position and moving towards the end of file 227 is to change.

File command interception module 201 permits file command 221 to pass through to file system manager 203 and also sends a copy of file command 221 to log interface module 202. File system manager 203 implements file command 221 to make indicated changes to portion 228. Log interface module 202 receives command 221 and formulates log record 226, including file name 222, offset 223, and size 224.

Method 300 includes an act of writing the size and offset from the intercepted file command to the transaction log to identify the portion of the file that is to change (act 302). For example, log interface module 202 can write log record 226 into transaction log 206.

Prior or subsequent to intercepting file command 221, file command interception module 201 can intercept file command 241. File command 241 includes file name 222, offset 243, and size 244. File name 222 identifies the name of file 227. Offset 243 and size 244 represent portion 229. Offset 243 indicates a starting position in file 227 where portion 229 starts. Size 244 represent how much data from the starting position and moving towards the end of file 227 is to change.

File command interception module permits file command 241 to pass through to file system manager 203 and also sends a copy of file command 241 to log interface module 202. File system manager 203 implements file command 241 to make indicated changes to portion 229. Log interface module 202 receives command 221 and formulates log record 266, including file name 222, offset 243, and size 244. Log interface module 202 can write log record 246 into transaction log 206.

Method 300 includes an act of detecting a file close for the file subsequent to writing the size and offset for file command into the transaction log (act 303). For example, file command intercept module 201 can intercept file close command 246, including file name 222, subsequent to writing log record 226 to transaction log 206. File close command 246 indicates that file 227 is to be closed. File command interception module permits file close command 246 to pass through to file system manager 203 and also sends a copy of file close command 246 to log cracker 207. Log cracker 207 receives file close command 246 from file command intercept module 201. File close command 246 indicates to log cracker 207 that current modifications to file 227 have ceased (although file 227 can later be re-opened). Accordingly, log cracker 207 views this as an appropriate time to mirror file data changes for file 227 to secondary servers 208.

In response to detecting the file close for the file, method 300 includes an act of reading the size and offset for the file command from the transaction log (act 304). For example, log cracker 207 can read log record 226 from transaction log 206. Log cracker 207 formulates mirror command 237, including file name 222, offset 223, and size 224. Log cracker sends mirror command 237 to file system 204. File system 204 receives mirror command 237 from log cracker 207.

In response to detecting the file close for the file, method 300 includes an act of accessing the portion of data identified by the offset and size from within the file (act 305). For example, file system 204 can access portion 228 as identified by offset 223 and size 224 from within file 227. In response to detecting the file close for the file, method 300 includes an act of sending the portion of the file to the one or more secondary database servers (act 306). For example, HADRON component 294 can send portion 228 to secondary servers 208.

In response to detecting the file close for the file, method 300 includes an act of sending the portion of the transaction log containing the size and offset from the file command to the one or more secondary database servers subsequent to sending the portion of the file to the one or more secondary database servers (act 307). For example, log cracker 207 can send log record 226 to secondary servers 208.

Interception of file close command 246 also occurs subsequent to writing log record 246 to transaction log 206. Thus, for some amount of time, log records 226 and 266 are in transaction log 206 prior to any file data being mirrored.

In response to detecting the file close for the file, log cracker 207 can also read log record 246 from transaction log 206. Log cracker 207 formulates mirror command 239, including file name 222, offset 243, and size 244. Log cracker sends mirror command 239 to file system 204. File system 204 receives mirror command 239 from log cracker 207. File system 204 can access portion 229 as identified by offset 243 and size 244 from within file 227. HADRON component 294 can send portion 229 to secondary servers 208. Log cracker 207 can send log record 246 to secondary servers 208.

Accordingly, embodiments of the invention include accumulating log records indicative of changes to a file within a transaction log until the file is closed. When the file is closed, the changes to the file can be mirrored to secondary servers and log records indicative of the changes replicated to the secondary servers.

Other mechanisms can also be used to group file changes together prior to recording log records and to signal when log records are to be recorded in a transaction log.

Figure 4:
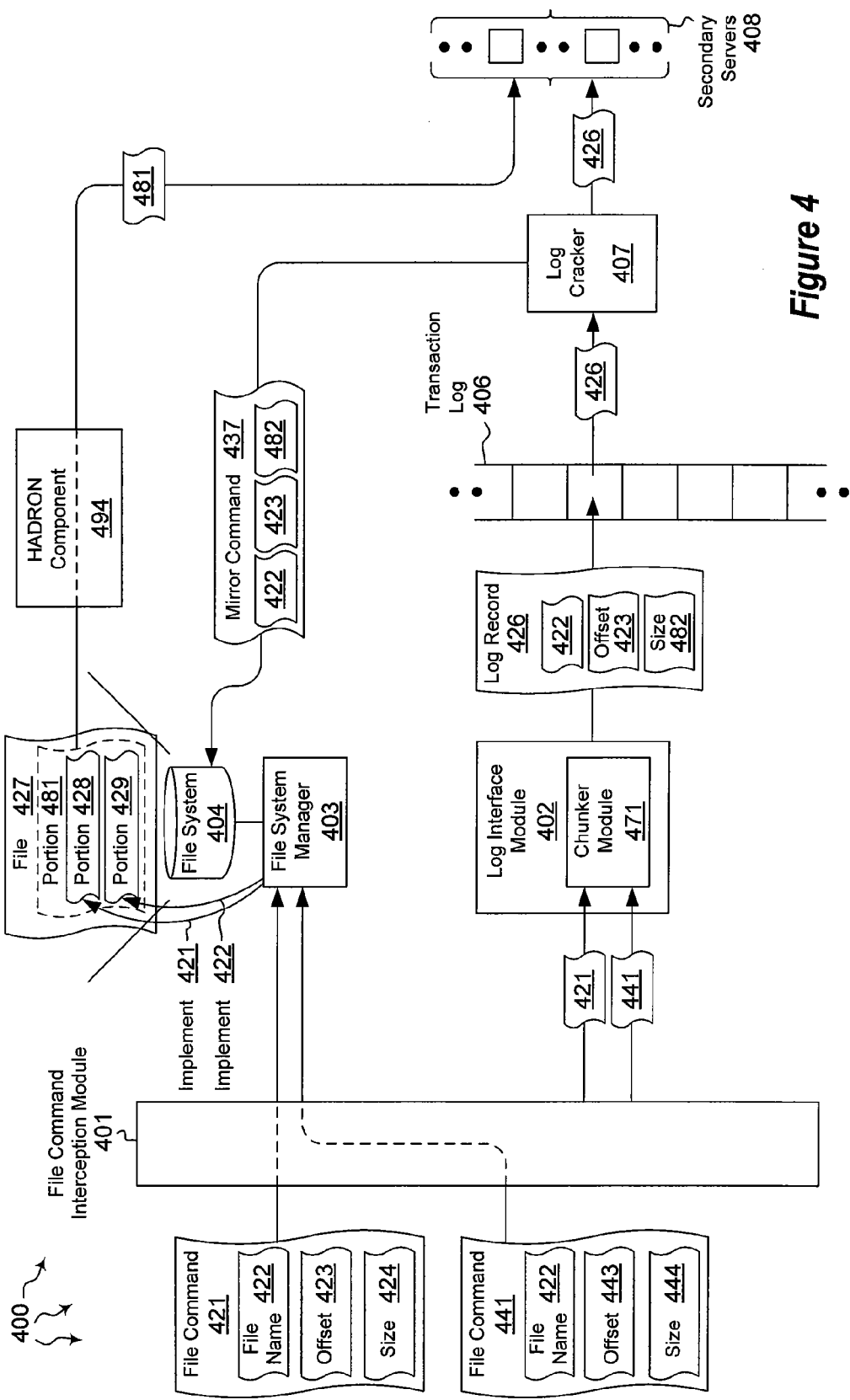
FIG. 4 illustrates a further example computer architecture that facilitates mirroring file data.

FIG. 4 illustrates computer architecture 400, similar to computer architectures 100 and 200, that facilitates mirroring data. As depicted, computer architecture 400 includes file command interception module 401, log interface module 402, file system manager 403, file system 404, transaction log 406, log cracker 407, HADRON component 494, and secondary servers 408. The components of computer architecture 200 have similar functionality to like named components in computer architecture 100 and can be similar connected to another and components at other computer systems.

Log interface module 402 further includes chunker module 471. Chunker module 471 is configured to coalesce offsets and sizes for different file commands for a file into larger blocks of file data. For example, adjacent portions of a file as well as partially overlapping portions of file a can be combined into a single larger block of data. Generally, chunker module 471 can combine portions of a file for some amount of time and then write the log records for large blocks of data to transaction log 406.

In some embodiments, chunker module 471 coalesces blocks of data until a specified number of blocks of data are accumulated. When the specified number of blocks is accumulated, chunker module 471 writes log records for the blocks of data to transaction log 406. In other embodiments, chunker module 471 coalesces blocks of data for a predetermined time interval. When the time interval expires, chunker module 471 writes log records for the blocks of data to transaction log 406. In further embodiments, chunker module 471 coalesces blocks of data until an indication is received (e.g., a file close command) that records for all blocks are to be written to transaction log 406.

Figure 5:
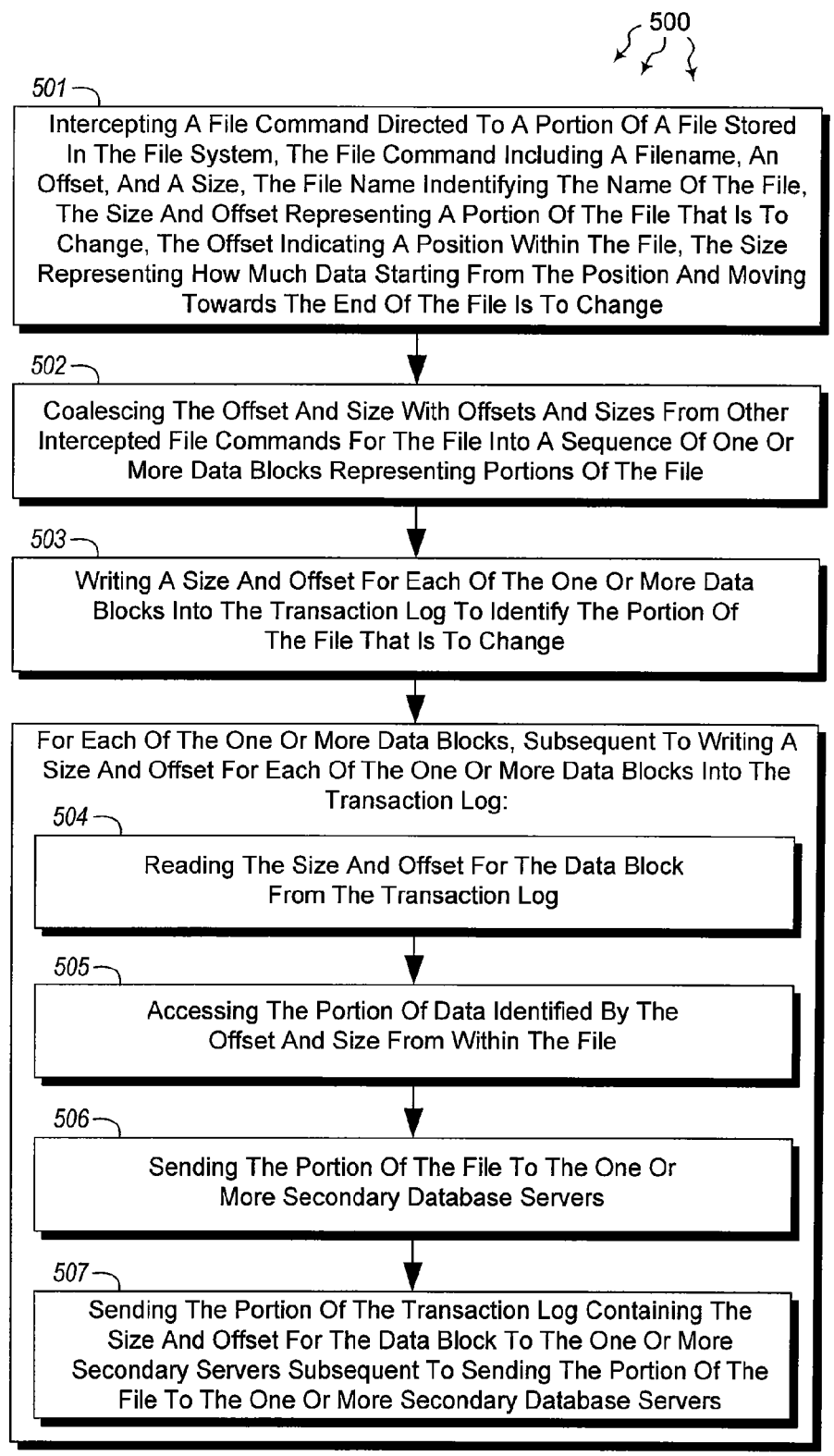
FIG. 5 illustrates another flow chart of an example method for mirroring file data.

FIG. 5 illustrates another flow chart of an example method 500 for mirroring file data. Method 500 will be described with respect to the components and data of computer architecture 400.

Method 500 includes an act of intercepting a file command directed to a portion of a file stored in the file system, the file command including a filename, an offset, and a size, the file name indentifying the name of the file, the size and offset representing a portion of the file that is to change, the offset indicating a position within the file, the size representing how much data starting from the position and moving towards the end of the file is to change (act 501). For example, file command interception module 402 can intercept file command 421, including file name 422, offset 423, and size 424. File name 422 identifies the name of file 427. Offset 423 and size 424 represent portion 428. Offset 423 indicates a starting position in file 427 where portion 428 starts. Size 424 represent how much data from the starting position and moving towards the end of file 427 is to change.

File command interception module 401 permits file command 421 to pass through to file system manager 403 and also sends a copy of file command 421 to log interface module 402. File system manager 403 implements file command 421 to make indicated changes to portion 428. Log interface module 402 passes file command 421 onto chunker module 471.

Prior or subsequent to intercepting file command 421, file command interception module 402 can intercept file command 441, including file name 422, offset 443, and size 444. File name 422 identifies the name of file 427. Offset 443 and size 444 represent portion 429. Offset 443 indicates a starting position in file 427 where portion 429 starts. Size 424 represent how much data from the starting position and moving towards the end of file 427 is to change.

File command interception module 401 permits file command 422 to pass through to file system manager 403 and also sends a copy of file command 422 to log interface module 402. File system manager 403 implements file command 422 to make indicated changes to portion 428. Log interface module 402 passes file command 422 onto chunker module 471.

Method 500 includes an act of coalescing the offset and size with offsets and sizes from other intercepted file commands for the file into a sequence of one or more data blocks representing portions of the file (act 502). For example, chunker module 471 can coalesce offset 423 and size 424 with offset 443 and size 444 into data block representing portion 481. Chunker module 471 can determine that portions 428 and 429 are adjacent or at least partially overlap with one another within file 427. In response, chunker module 471 can form a single contiguous block identified by offset 423 and size 482 that covers portions 428 and 429 (i.e., portion 481).

Method 500 includes an act of writing a size and offset for each of the one or more data blocks into the transaction log to identify the portion of the file that is to change (act 503). For example, log interface module 402 can write log record 426 to transaction log 406. Log record 426 includes file name 422, offset 423, and size 482. Collectively, offset 423 and size 482 identify portion 481.

For each of the one or more data blocks, subsequent to writing a size and offset for each of the one or more data blocks into the transaction log, method 500 includes an act reading the size and offset for the data block from the transaction log (act 504). For example, log cracker 407 can read log record 426 from transaction log 406. Log cracker 407 formulates mirror command 437, including file name 422, offset 423, and size 482. Log cracker sends mirror command 437 to file system 404. File system 404 receives mirror command 437 from log cracker 407.

For each of the one or more data blocks, subsequent to writing a size and offset for each of the one or more data blocks into the transaction log, method 500 includes an act of accessing the portion of data identified by the offset and size from within the file (act 505). For example, file system 404 can access portion 481 as identified by offset 423 and size 482 from within file 427. For each of the one or more data blocks, subsequent to writing a size and offset for each of the one or more data blocks into the transaction log, method 500 includes an act of sending the portion of the file to the one or more secondary database servers (act 506). For example, HADRON component 494 can send portion 481 to secondary servers 408.

For each of the one or more data blocks, subsequent to writing a size and offset for each of the one or more data blocks into the transaction log, method 500 includes sending the portion of the transaction log containing the size and offset for the data block to the one or more secondary servers subsequent to sending the portion of the file to the one or more secondary database servers (act 507). For example, log cracker 407 can send log record 426 to secondary servers 408.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a database server including one or more processors and system memory, the database server connected to one or more secondary database servers via a network, the database server also including a database, a file system, and a transaction log, the file system storing file system data separate from a main database file of the database, the transaction log for logging operations that occur at the database server, a method for mirroring changes to file system data to the one or more secondary database servers, the method comprising:

an act of intercepting a file command directed to a portion of a file stored in the file system, the file command including a filename, an offset, and a size, the file name identifying the name of the file, the size and offset representing a portion of the file that is to change, the offset indicating a position within the file, the size representing how much data starting from the position and moving towards the end of the file is to change;

an act of coalescing blocks of data associated with at least the intercepted file command and at least one or more other intercepted file commands by coalescing the offset and size of the intercepted file command with offsets and sizes from the one or more other intercepted file commands for the file into a sequence of one or more data blocks representing portions of the file;

an act of receiving an indication that records for all coalesced blocks of data are to be written to the transaction log; and an act of writing a size and offset for each of the one or more data blocks into the transaction log to identify the portion of the file that is to change in response to receiving the indication;

for each of the one or more data blocks, subsequent to writing a size and offset for each of the one or more data blocks into the transaction log:

an act of reading the size and offset for the data block from the transaction log;

an act of accessing the portion of data identified by the offset and size from within the file;

an act of sending the portion of the file to the one or more secondary database servers; and an act of sending the portion of the transaction log containing the size and offset for the data block to the one or more secondary servers subsequent to sending the portion of the file to the one or more secondary database servers.

2. The method as recited in claim 1, wherein the act of intercepting a file command for changing the contents of a file stored in the file system comprises an act of intercepting a file write completion command.

3. The method as recited in claim 1, wherein the act of intercepting a file command for changing the contents of a file stored in the file system comprises an act of intercepting a file close command.

4. The method as recited in claim 1, wherein the act of intercepting a file command for changing the contents of a file stored in the file system comprises an act of intercepting a command from a file system API.

5. The method as recited in claim 1, wherein the act of intercepting a file command for changing the contents of a file stored in the file system comprises an act of intercepting a T-SQL command.

6. The method as recited in claim 1, further comprising an act of detecting that a specified number of blocks having been accumulated from coalescing; and wherein the an act of writing a size and offset for each of the one or more data blocks into the transaction log comprises an act of writing a size and offset for each of the specified number of blocks into the transaction log in response to detecting that the specified number of blocks has been accumulated.

7. The method as recited in claim 1, further comprising an act of detecting that a specified amount of time has elapsed since offsets and sizes for blocks were last written to the transaction log; and wherein the an act of writing a size and offset for each of the one or more data blocks into the transaction log comprises an act of writing a size and offset for each of the one or more blocks into the transaction log in response to detecting that the specified amount of time has elapsed.

8. The method as recited in claim 1, wherein the file is a Binary Large Object ("BLOB").

9. The method as recited in claim 1, wherein the act of an act of reading the size and offset for the data block from the transaction log comprises an act of reading the size and offset for the data block in response to detecting a file close command for the file, the file close command comprising the indication.

10. At a database server including one or more processors and system memory, the database server connected to one or more secondary database servers via a network, the database server also including a database, a file system, and a transaction log, the file system storing file system data separate from a main database file of the database, the transaction log for logging operations that occur at the database server, a method for mirroring changes to file system data to the one or more secondary database servers, the method comprising:

an act of intercepting a file command directed to a portion of a file stored in the file system, the file command including a filename, an offset, and a size, the file name identifying the name of the file, the size and offset representing a portion of the file that is to change, the offset indicating a position within the file, the size representing how much data starting from the position and moving towards the end of the file is to change;

an act of coalescing the offset and size with offsets and sizes from other intercepted file commands for the file into a sequence of one or more data blocks representing portions of the file;

an act of writing a size and offset for each of the one or more data blocks into the transaction log to identify the portion of the file that is to change;

for each of the one or more data blocks, subsequent to writing a size and offset for each of the one or more data blocks into the transaction log:
  an act of reading the size and offset for the data block from the transaction log;
  an act of accessing the portion of data identified by the offset and size from within the file;
  an act of sending the portion of the file to the one or more secondary database servers; and
  an act of sending the portion of the transaction log containing the size and offset for the data block to the one or more secondary servers subsequent to sending the portion of the file to the one or more secondary database servers;

an act of intercepting a second file command directed to a second portion of the file, the second command including the filename, a second offset, and a second size, the second offset indicating a second different start position in the file where a change is to occur, the second size representing how much data starting from the second different position and moving towards the end of the file is to change; and wherein the act of coalescing the offset and size with offsets and sizes from other intercepted file commands comprises:
  an act of determining that the portion and second portion of the file can be combined into a single contiguous data block based on the offset and size and the second offset and second size;
  an act of forming a single contiguous block identified by a block offset and block size that covers the portion and the second portion of the file.

11. The method as recited in claim 10, wherein the act of determining that the portion and second portion of the file can be combined into a single contiguous data block comprises an act of determining that the portion of the file and the second portion of the file are adjacent to one another within the file.

12. The method as recited in claim 10, wherein the act of determining that the portion and second portion of the file can be combined into a single contiguous data block comprises an act of determining that the portion of the file and the second portion of the file at least partially overlap within the file.

13. The method as recited in claim 10, further comprising ran act of reordering the one or more data blocks into an appropriate sequence of data blocks subsequent to forming a single continuous block that covers the portion and the second portion of the file.

14. A computer program product for use at a database server including one or more processors and system memory, the database server connected to one or more secondary database servers via a network, the database server also including a database, a file system, and a transaction log, the file system storing file system data separate from a main database file of the database, the transaction log for logging operations that occur at the database server, the computer program product comprising one or more storage devices having stored thereon computer-executable instructions which, when executed at the one or more processors, cause the database server to implemented a method for mirroring changes to file system data to the one or more secondary database servers, the method comprising:

an act of intercepting a file command directed to a portion of a file stored in the file system, the file command including a filename, an offset, and a size, the file name identifying the name of the file, the size and offset representing a portion of the file that is to change, the offset indicating a position within the file, the size representing how much data starting from the position and moving towards the end of the file is to change;

an act of coalescing blocks of data associated with at least the intercepted file command and at least one or more other intercepted file commands by coalescing the offset and size of the intercepted file command with offsets and sizes from the one or more other intercepted file commands for the file into a sequence of one or more data blocks representing portions of the file;

an act of receiving an indication that records for all coalesced blocks of data are to be written to the transaction log; and an act of writing a size and offset for each of the one or more data blocks into the transaction log to identify the portion of the file that is to change in response to receiving the indication;

for each of the one or more data blocks, subsequent to writing a size and offset for each of the one or more data blocks into the transaction log:
  an act of reading the size and offset for the data block from the transaction log;
  an act of accessing the portion of data identified by the offset and size from within the file;
  an act of sending the portion of the file to the one or more secondary database servers; and an act of sending the portion of the transaction log containing the size and offset for the data block to the one or more secondary servers subsequent to sending the portion of the file to the one or more secondary database servers.

15. The computer program product as recited in claim 14, wherein the act of intercepting a file command for changing the contents of a file stored in the file system comprises an act of intercepting a file write completion command.

16. The computer program product as recited in claim 14, wherein the act of an act of reading the size and offset for the data block from the transaction log comprises an act of reading the size and offset for the data block in response to detecting a file close command for the file, the file close command comprising the indication.

17. The computer program product as recited in claim 14, further comprising an act of detecting that a specified number of blocks having been accumulated from coalescing; and
   wherein the an act of writing a size and offset for each of the one or more data blocks into the transaction log comprises an act of writing a size and offset for each of the specified number of blocks into the transaction log in response to detecting that the specified number of blocks has been accumulated.

18. The computer program product as recited in claim 17, wherein the file stored in the file system is a Binary Large Object ("BLOB").

19. The computer program product as recited in claim 14, further comprising an act of detecting that a specified amount of time has elapsed since offsets and sizes for blocks were last written to the transaction log; and
   wherein the an act of writing a size and offset for each of the one or more data blocks into the transaction log comprises an act of writing a size and offset for each of the one or more blocks into the transaction log in response to detecting that the specified amount of time has elapsed.

20. A computer program product for use at a database server including one or more processors and system memory, the database server connected to one or more secondary database servers via a network, the database server also including a database, a file system, and a transaction log, the file system storing file system data separate from a main database file of the database, the transaction log for logging operations that occur at the database server, the computer program product comprising one or more storage devices having stored thereon computer-executable instructions which, when executed at the one or more processors, cause the database server to implemented a method for mirroring changes to file system data to the one or more secondary database servers, the method comprising:

an act of intercepting a file command directed to a portion of a file stored in the file system, the file command including a filename, an offset, and a size, the file name identifying the name of the file, the size and offset representing a portion of the file that is to change, the offset indicating a position within the file, the size representing how much data starting from the position and moving towards the end of the file is to change;

an act of coalescing the offset and size with offsets and sizes from other intercepted file commands for the file into a sequence of one or more data blocks representing portions of the file;

an act of writing a size and offset for each of the one or more data blocks into the transaction log to identify the portion of the file that is to change;

for each of the one or more data blocks, subsequent to writing a size and offset for each of the one or more data blocks into the transaction log:
   an act of reading the size and offset for the data block from the transaction log;
   an act of accessing the portion of data identified by the offset and size from within the file;
   an act of sending the portion of the file to the one or more secondary database servers; and
   an act of sending the portion of the transaction log containing the size and offset for the data block to the one or more secondary servers subsequent to sending the portion of the file to the one or more secondary database servers;

an act of intercepting a second file command directed to a second portion of the file, the second command including the filename, a second offset, and a second size, the second offset indicating a second different start position in the file where a change is to occur, the second size representing how much data starting from the second different position and moving towards the end of the file is to change; and wherein the act of coalescing the offset and size with offsets and sizes from other intercepted file commands comprises:
   an act of determining that the portion and second portion of the file can be combined into a single contiguous data block based on the offset and size and the second offset and second size;
   an act of forming a single contiguous block identified by a block offset and block size that covers the portion and the second portion of the file.

* * * * *